Jan. 22, 1935.     W. OWEN     1,988,565
GLASS CUTTING APPARATUS
Filed April 13, 1934     5 Sheets-Sheet 2

INVENTOR
WILLIAM OWEN
BY
Bradley & Bee
ATTORNEYS

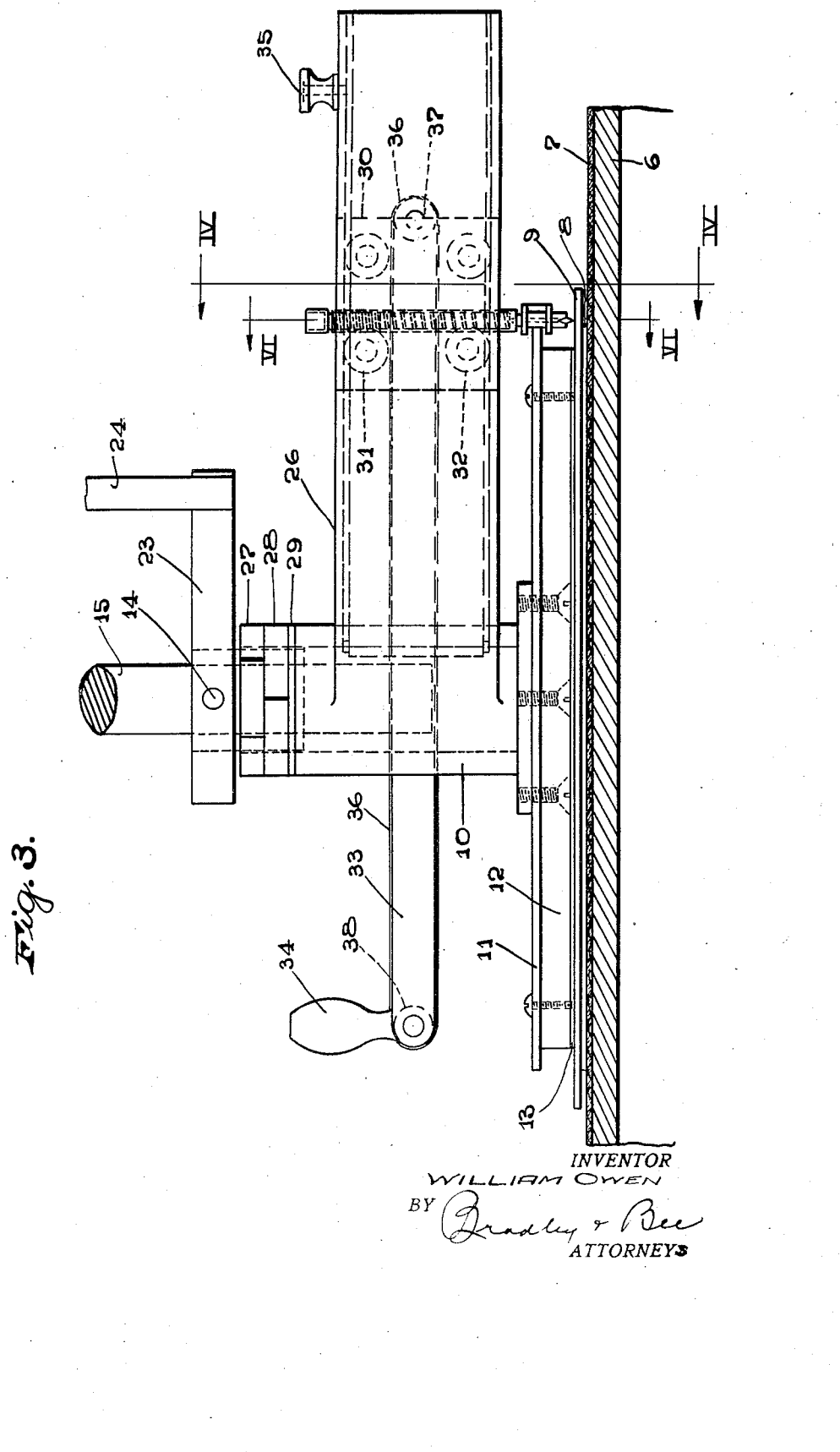

Jan. 22, 1935.  W. OWEN  1,988,565
GLASS CUTTING APPARATUS
Filed April 13, 1934   5 Sheets-Sheet 4
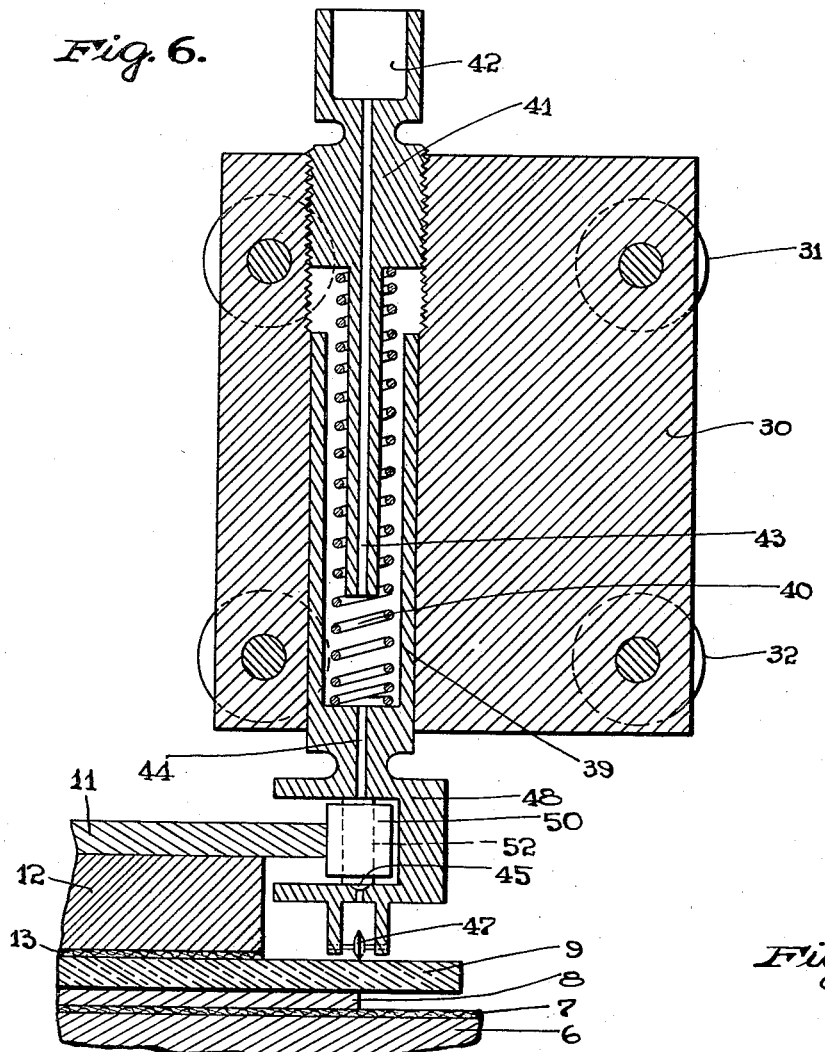
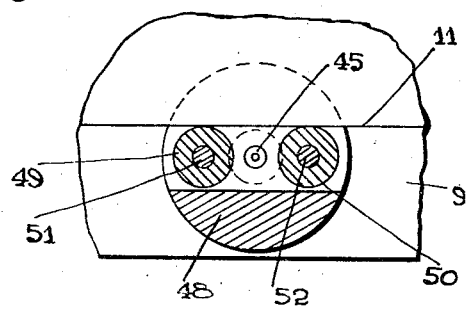
INVENTOR
WILLIAM OWEN.
BY
ATTORNEYS

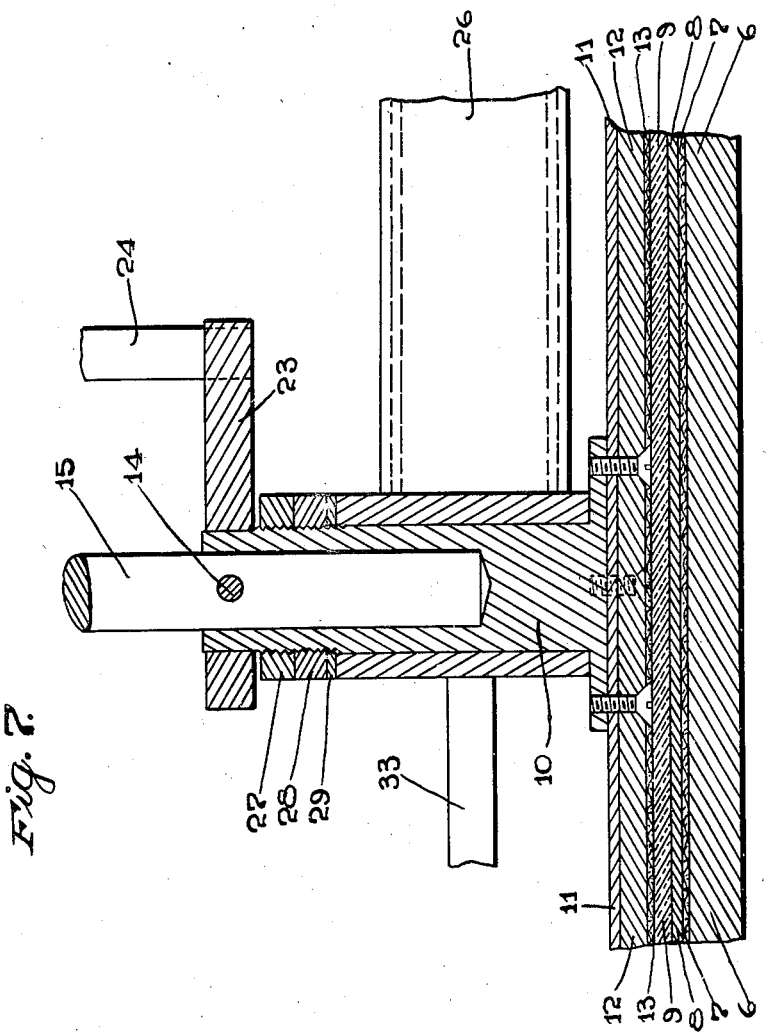

Patented Jan. 22, 1935

1,988,565

UNITED STATES PATENT OFFICE 1,988,565

GLASS CUTTING APPARATUS

William Owen, Pittsburgh, Pa., assignor to Pittsburgh Plate Glass Company, a corporation of Pennsylvania Application April 13, 1934, Serial No. 720,422

8 Claims. (Cl. 49—48)

Figure 1:
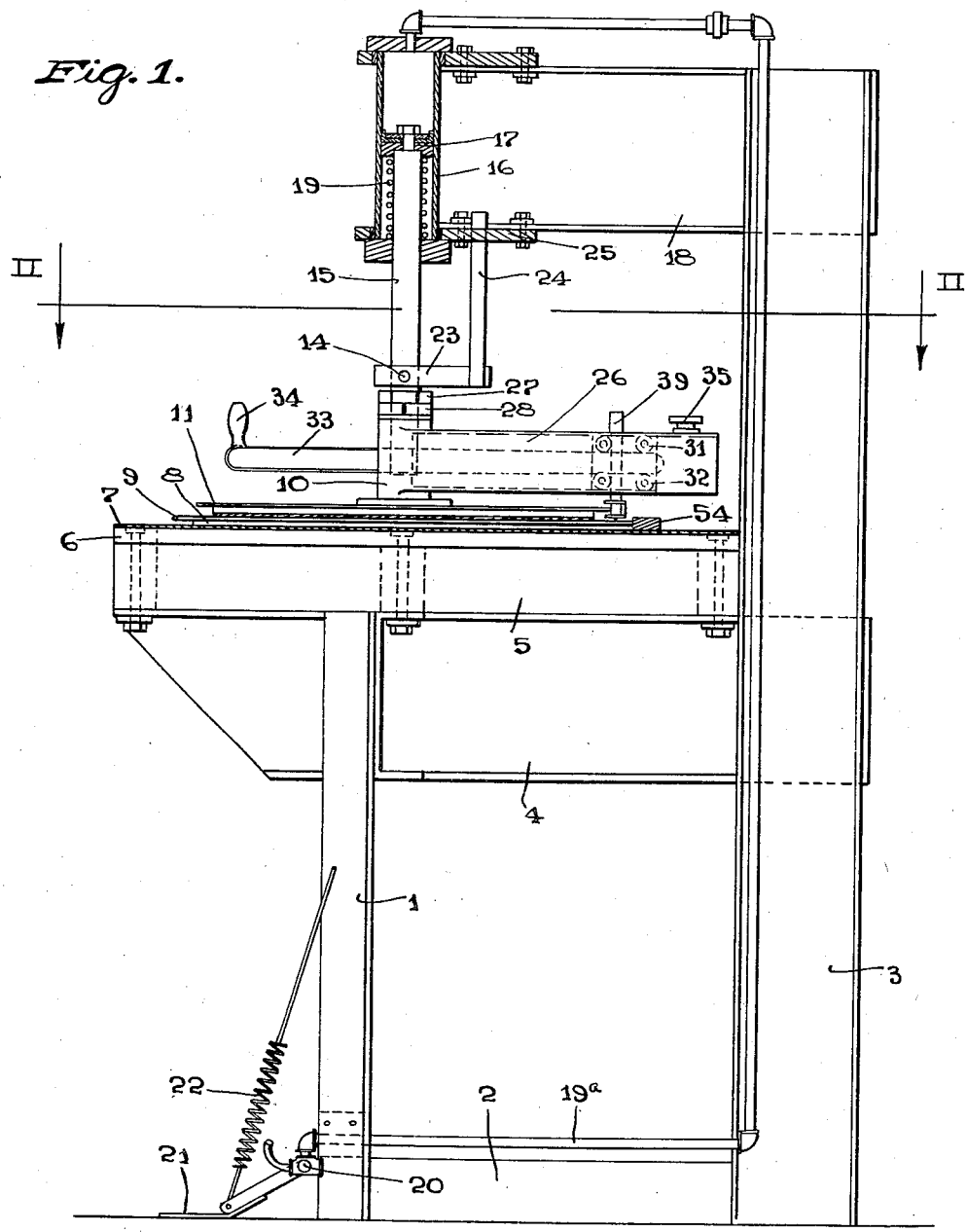
Figure 2:
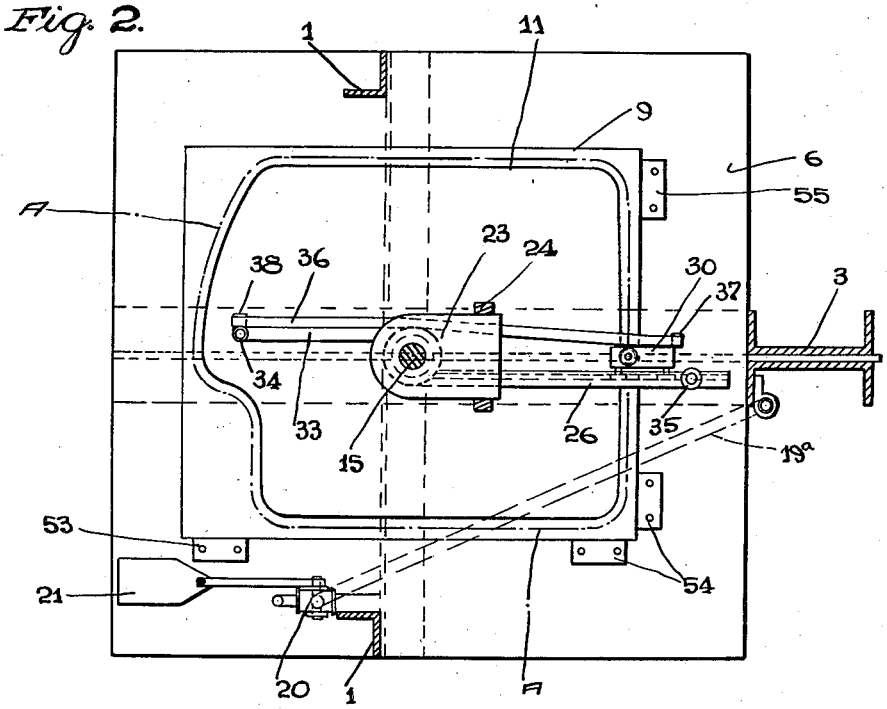
Figure 4:
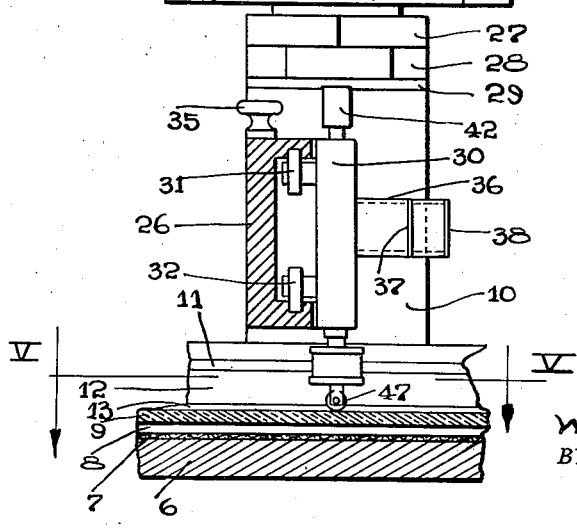

The invention relates to apparatus for cutting glass plates or sheets to exact shapes which require templets to guide the cutters, such as is required in sheets having curves of various kinds like body lights for automobiles and windshields. The device has a large field of use in cutting sheets of relatively thin glass which is to be used in making safety glass, wherein it is highly desirable that the pairs of glass sheets which enter into each plate of safety glass shall be of precisely the same shape and size. One object of the invention is the provision of cutting apparatus which is of simple construction, and which can be used with the same relatively cheap metal templets that are now employed for hand cutting. A further object is the provision of an apparatus which does not require the skill of hand cutting, and by whose use the operator can accomplish several times the amount of work done by a hand operator per unit of time. Other objects are the provision of an apparatus capable of cutting curves of small radius and which permits the snapping off operation to be performed rapidly without moving the glass sheet from the support on which it is cut, thus greatly increasing the output, as heretofore the cracking off operation has required more time than the scoring operation. One embodiment of the invention is illustrated in the accompanying drawings, in which:

Figure 1 is a side elevation partially in section of the apparatus. Fig. 2 is a section on the line II—II of Fig. 1. Fig. 3 is a view similar to that of Fig. 1 on an enlarged scale and showing only a part of the apparatus. Fig. 4 is a section on the line IV—IV of Fig. 3. Fig. 5 is a section on the line V—V of Fig. 4. Fig. 6 is an enlarged section on the line VI—VI of Fig. 3. And Fig. 7 is an enlarged fragmentary section of the apparatus as shown in Fig. 3.

Referring to the drawings, the parts 1, 2, 3, 4 and 5 constitute the framework on which is carried a table 6 for supporting the glass sheets which are to be cut. This table is provided on its upper surface with a cover or pad 7 of felt or heavy cloth. Mounted upon this cover 7 is a cracking off plate 8, preferably of sheet aluminum about $\frac{1}{16}$" in thickness held in position on the table top by any suitable means. This snapping off plate has the exact size and contour to be produced in the sheet of glass 9 which is to be cut.

Mounted for movement toward and from the table is a head 10 which has fastened to its lower face a templet plate 11, also preferably of aluminum and having the exact contour to which the glass sheet 9 is to be cut, but slightly less in size. As later explained, the edge of this templet plate acts as a guide for the cutter in the cutting operation. It carries upon its lower side a spacing plate 12, and the lower side of this spacing plate is provided with a sheet or pad 13 of soft material, such as cloth or felt. During the cutting operation, the glass sheet 9 is securely clamped between the spacing plate 12 and the snapping off plate 8. The head 10 is secured by means of a pin 14 to a piston rod 15, and such piston rod is moved down to secure the clamping action above referred to by means of fluid pressure supplied to a cylinder 16 carrying the piston 17.

The cylinder 16 is carried by an arm 18 welded at one end to the frame member 3, and an upward movement of the piston in the cylinder is accomplished by means of a spring 19 which operates to lift the head when the air pressure behind the piston 17 is released. Air is supplied to the upper end of the cylinder by means of the pipe 19a which is provided with a valve 20. This valve is controlled by a foot pedal 21 normally pulled upward by means of a spring 22, and arranged to admit air to the pipe 19a when pushed down to the position indicated in Fig. 1. Any other suitable means might be employed for raising and lowering the head 10 which carries the templet 11. In order to hold the rod 15 and the head 10 against rotation, the plate 23 and slide rods 24 are employed, the plate 23 being secured to the head 10 and rod 15 by means of the pin 14. The rod 24 extends slidably along the plate 25 bolted to the arm 18. Any other suitable means might be employed for holding the rod 15 and head against rotative movement during the operation of the apparatus.

Swivelled on the head 10 is the cutter arm 26, the parts being held in assembled relation by means of the nuts 27 and 28, and a washer 29 being interposed between the upper end of the head and the nut 28. The arm 26 is of channel shape in cross section, as indicated in Fig. 4, and the inner faces of the channel flanges are grooved to provide a runway for the rollers of the cutter carriage. The cutter carriage consists of a rectangular plate 30 provided with the rollers 31 and 32 which engage the grooves in the flanges of the arm 26. The cutter arm 26 is provided with an extension arm 33 carrying a knob or handle 34 at its end. The outer end of the arm 26 is also provided with another knob or handle 35, and the operator in swinging the arm to perform the cutting operation, grasps the knobs 34 and 35 in his hands and gives the cutter arm its movement of rotation about the vertical center line of the head 10. The carriage 30 is yieldingly pulled toward the axis of rotation of the arm 26 by means of an endless rubber band 36 which passes around the knob 37 projecting from the side of the carriage and around the knob 38 projecting from the side of the arm 33. Any other suitable means might be employed for yieldingly pulling or forcing the carriage inward on the cutter arm, such as springs or weights.

Swivelled in the carriage 30 is the cutter spindle 39, such cutter spindle being yieldingly pushed down by means of a spring 40. The tension of the spring is adjusted by means of the screw plug 41 having a cup 42 at its upper end which carries a supply of kerosene which is fed down to the glass at the cutter to permit the cut to be made more easily. The plug is provided with a passageway 43 through which the kerosene passes down to the passageway 44, from which it can drop down into the cup 45, leading down to the cutter wheel 47. The lower end of the cutter spindle 39 is provided with a bracket 48 which is U-shape in cross section and carries a pair of rollers 49 and 50 mounted for rotation on the pivots 51 and 52. These rollers, as indicated in Fig. 5, are located on opposite sides of the axis of rotation of the spindle and are arranged to engage the edge of the templet plate 11. Due to the use of the rubber band 36, the rollers are maintained in yielding engagement with the edge of the templet plate, so that, in making the cut, the operator merely swings the arm so as to make a complete rotation about the center line of the head. The two rollers 49 and 50 always maintain the cutter 47 in the same relation with respect to the glass and with respect to the edge of the templet. In the case of a cutter wheel, such as that shown in the drawings, the axis of rotation of the cutter wheel thus held is at all times at right angles to the direction in which the cutter is being moved. It follows that no particular skill is necessary in using the apparatus, and since all that is necessary is the swinging of the arm, the glass sheets may be cut very rapidly. The glass sheets 9 are preferably positioned with respect to the cutter head by means of the stops 53, 54 and 55 (Fig. 2).

After the parts have been positioned as indicated in Figs. 1 and 2 with the glass sheet 9 clamped upon the cracking off plate 8 by the head 10, the operator grasps the knobs 34 and 35 and gives the arm a complete movement of rotation scoring the glass along the line marked A in Fig. 2. This line of scoring is in exact alignment with the edge of the cracking off plate 8 so that after the sheet has been scored, it can be very quickly cracked off by merely pressing down upon the edges of the sheet outward of the line of scoring. To facilitate this cracking off, it is customary to run several transverse score lines from the line of cut to the outer edge of the sheet so that the cracking off will occur in three or four sections. It will be seen that the cracking off operation can be accomplished very rapidly by the cutter after the scoring operation, as this work is done while the glass sheet still remains in the position of scoring and without the necessity of removing it from such position to another position before applying pressure to break off the edges, as has heretofore been the practice. The apparatus can be operated with great speed, no difficulty being experienced in scoring and cracking off three or four sheets per minute, and the cutting is accomplished with considerable more accuracy than is possible with hand cutting.

What I claim is:

1. In combination in glass cutting apparatus, a support for a glass sheet, a clamping head mounted for movement toward and from the support, a templet plate carried by the head, an arm swivelled on the head, a carrier mounted for movement along the arm, a cutter spindle swivelled in the carrier and provided with a cutting element arranged axially of the spindle at its end, a pair of guide members carried by the spindle on opposite sides of its axis of rotation and adapted to engage the edge of the templet plate, and means yieldingly forcing the carriage inward toward the axis of rotation of the arm.

2. In combination in glass cutting apparatus, a support for a glass sheet, a clamping head mounted for movement toward and from the support, a templet plate carried by the head, an arm swivelled on the head, a carrier mounted for movement along the arm, a cutter spindle swivelled in the carrier and provided with a cutting element arranged axially of the spindle at its end, a pair of guide rollers carried by the spindle adjacent the cutter on opposite sides thereof and adapted to engage the edge of the templet plate, and means for yieldingly pulling the carriage inward toward the axis of rotation of the arm.

3. In combination in glass cutting apparatus, a support for a glass sheet, a clamping head mounted for movement toward and from the support, a templet plate carried by the head, an arm swivelled on the head, a carrier mounted for movement along the arm, a cutter spindle swivelled in the carrier and provided with a cutting element arranged axially of the spindle at its end, a pair of guide members carried by the spindle on opposite sides of its axis of rotation and adapted to engage the edge of the templet plate, and a rubber band yieldingly pulling the carriage inward toward the axis of rotation of the arm.

4. In combination in glass cutting apparatus, a support for a glass sheet, a clamping head mounted for movement toward and from the support, a templet plate carried by the head, a spacer on the lower side of the templet plate for engaging the glass sheet, an arm swivelled on the head, a carrier mounted for movement along the arm, a cutter spindle swivelled in the carrier and provided with a cutting element arranged axially of the spindle at its end, a pair of guide members carried by the spindle on opposite sides of its axis of rotation and adapted to engage the edge of the templet plate, and means yieldingly forcing the carriage inward toward the axis of rotation of the arm.

5. In combination in glass cutting apparatus, a supporting table, a snapping off plate on the support having the size and contour of the glass sheet to be cut after such sheet is cut, a clamping head mounted for movement toward and from the table, a templet plate carried by the head, an arm swivelled on the head, a carrier mounted for movement along the arm, a cutter spindle swivelled in the carrier and provided with a cutting element arranged axially of the spindle at its end, a pair of guide members carried by the spindle on opposite sides of its axis of rotation and adapted to engage the edge of the templet plate, and means yieldingly forcing the carriage inward toward the axis of rotation of the arm.

6. In combination in glass cutting apparatus, a supporting table, a snapping off plate on the support having the size and contour of the glass sheet to be cut after such sheet is cut, a clamping head mounted for movement toward and from the table, a templet plate carried by the head, a spacer on the lower side of the templet plate for engaging the glass sheet and clamping it against the snapping off plate, an arm swivelled on the head, a carrier mounted for movement along the arm, a cutter spindle swivelled in the carrier and provided with a cutting element arranged axially of the spindle at its end, a pair of guide members carried by the spindle on opposite sides of its axis of rotation and adapted to engage the edge of the templet plate, and means yieldingly forcing the carriage inward toward the axis of rotation of the arm.

7. In combination in glass cutting apparatus, a support for a glass sheet, a clamping head mounted for movement toward and from the support, a templet plate carried by the head, an arm swivelled on the head, a carrier mounted for movement along the arm, a cutter spindle swivelled in the carrier and provided with a cutting element mounted on the end of the spindle, yielding means for moving the cutter downward, means yieldingly forcing the carriage inward, and means movable with the carrier engaging the edge of the templet plate.

8. In combination in glass cutting apparatus, a supporting table, a snapping off plate on the support having the size and contour of the glass sheet to be cut after such sheet is cut, a clamping head mounted for movement toward and from the table, a templet plate carried by the head, an arm swivelled on the head, a carrier mounted for movement along the arm and provided with a cutter, and means for yieldingly forcing the carriage inward toward the axis of rotation of the arm.

WILLIAM OWEN.